United States Patent
Ragupathi et al.

(10) Patent No.: US 10,437,303 B2
(45) Date of Patent: Oct. 8, 2019

(54) SYSTEMS AND METHODS FOR CHASSIS-LEVEL VIEW OF INFORMATION HANDLING SYSTEM POWER CAPPING

(71) Applicant: Dell Products L.P., Round Rock, TX (US)

(72) Inventors: Dinesh Kunnathur Ragupathi, Round Rock, TX (US); Venkatesh Ramamoorthy, Round Rock, TX (US); Arun Muthaiyan, Round Rock, TX (US); Yogesh Prabhakar Kulkarni, Round Rock, TX (US); Elie Antoun Jreij, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 111 days.

(21) Appl. No.: 15/160,117

(22) Filed: May 20, 2016

(65) Prior Publication Data

US 2017/0336855 A1    Nov. 23, 2017

(51) Int. Cl.
  *G06F 1/32*    (2019.01)
  *G06F 1/28*    (2006.01)
  *G06F 1/26*    (2006.01)
  *G06F 1/3203*  (2019.01)

(52) U.S. Cl.
  CPC .............. *G06F 1/28* (2013.01); *G06F 1/26* (2013.01); *G06F 1/3203* (2013.01)

(58) Field of Classification Search
  CPC ............................ G06F 1/3296; G06F 1/266
  USPC ........................................................ 713/300
  See application file for complete search history.

(56) References Cited

U.S. PATENT DOCUMENTS

| | | | | |
|---|---|---|---|---|
| 6,157,173 A | * | 12/2000 | Baranowski | H02J 7/0068 320/152 |
| 7,871,278 B1 | * | 1/2011 | Herring | H01R 29/00 439/136 |
| 8,375,228 B2 | * | 2/2013 | Kashyap | G06F 9/5027 713/300 |
| 9,250,684 B1 | * | 2/2016 | Chen | G06F 1/3206 |
| 9,477,279 B1 | * | 10/2016 | Piszczek | G06F 11/3062 |
| 2005/0136989 A1 | * | 6/2005 | Dove | G06F 1/266 455/572 |
| 2006/0248362 A1 | * | 11/2006 | Kasek | G06F 9/5077 713/300 |
| 2006/0288241 A1 | * | 12/2006 | Felter | G06F 1/3203 713/300 |

(Continued)

*Primary Examiner* — Volvick Derose
(74) *Attorney, Agent, or Firm* — Jackson Walker L.L.P.

(57) ABSTRACT

In accordance with embodiments of the present disclosure, a system may include a chassis comprising a plurality of slots, each of the plurality of slots configured to receive a respective modular information handling system, a shared infrastructure comprising a plurality of components which are shared by modular information handling systems received in the slots, and a controller communicatively coupled to the slots and configured to determine a shared infrastructure power consumption indicative of power consumed by the shared infrastructure, allocate the shared infrastructure power consumption among modular information handling systems received in the slots, and set a respective host-level power limit for each of the modular information handling systems received in the slots, such that each modular information handling system consumes power in accordance with its respective host-level power limit.

18 Claims, 4 Drawing Sheets

(56) References Cited

U.S. PATENT DOCUMENTS

| | | | | |
|---|---|---|---|---|
| 2007/0274113 | A1* | 11/2007 | Wang | H02M 1/10 363/109 |
| 2008/0052437 | A1* | 2/2008 | Loffink | G06F 1/189 710/302 |
| 2008/0073975 | A1* | 3/2008 | Wight | G06F 3/023 307/32 |
| 2008/0222435 | A1* | 9/2008 | Bolan | G06F 1/3203 713/310 |
| 2009/0055665 | A1* | 2/2009 | Maglione | G06F 1/206 713/320 |
| 2009/0125737 | A1* | 5/2009 | Brey | G06F 1/3203 713/322 |
| 2011/0029787 | A1* | 2/2011 | Day | G06F 1/266 713/300 |
| 2011/0072293 | A1* | 3/2011 | Mazzaferri | G06F 1/3203 713/340 |
| 2011/0185356 | A1* | 7/2011 | Shetty | G06F 9/5077 718/1 |
| 2011/0289327 | A1* | 11/2011 | Nolterieke | G06F 1/26 713/300 |
| 2012/0109390 | A1* | 5/2012 | Delong | H02J 3/06 700/287 |
| 2012/0192007 | A1* | 7/2012 | Weilnau, Jr. | G06F 1/30 714/14 |
| 2012/0226922 | A1* | 9/2012 | Wang | G06F 1/3203 713/320 |
| 2013/0226362 | A1* | 8/2013 | Jagadishprasad | G06F 9/5094 700/297 |
| 2013/0318371 | A1* | 11/2013 | Hormuth | G06F 1/28 713/320 |
| 2014/0006676 | A1* | 1/2014 | Chandrasekhar | G06F 13/4022 710/316 |
| 2014/0052309 | A1* | 2/2014 | Chandrasekhar | G06F 1/26 700/297 |
| 2014/0115357 | A1* | 4/2014 | Li | G06F 1/3234 713/320 |
| 2014/0359310 | A1* | 12/2014 | Haridass | G06F 9/5094 713/300 |
| 2015/0148978 | A1* | 5/2015 | Wu | H02J 13/0086 700/295 |
| 2015/0277461 | A1* | 10/2015 | Anderson | H02J 1/14 307/32 |
| 2016/0011914 | A1* | 1/2016 | Bohn | G06F 9/5094 713/300 |
| 2016/0073543 | A1* | 3/2016 | VanNess | G06F 1/3287 361/679.02 |
| 2017/0228003 | A1* | 8/2017 | Brewer | G06F 1/266 |
| 2017/0255247 | A1* | 9/2017 | Ardanaz | G06F 1/266 |
| 2018/0166906 | A1* | 6/2018 | Malhotra | H04B 5/00 |

* cited by examiner

SYSTEMS AND METHODS FOR CHASSIS-LEVEL VIEW OF INFORMATION HANDLING SYSTEM POWER CAPPING

TECHNICAL FIELD

The present disclosure relates in general to information handling systems, and more particularly to systems and methods for controlling power consumption of a modular information handling system based on power consumption of shared infrastructure of a chassis in which the modular information handling system is received.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Increasingly, information handling systems are being utilized in architectures including a system chassis with multiple modular information handling systems received therein and with a shared infrastructure of various peripheral and input/output capabilities common to the chassis as a whole which may be shared by the multiple modular information handling systems.

To manage power consumption of information handling systems, power limits or "caps" are often applied to information handling systems, limiting the amount of power they may consume, in order to facilitate sharing of available power to a system, as well as for thermal control of an information handling system. Existing approaches to power management do not often take into account a modular information handling system's usage of shared infrastructure of a chassis.

SUMMARY

In accordance with the teachings of the present disclosure, the disadvantages and problems associated with power management of modular information handling systems in a chassis with shared infrastructure may be reduced or eliminated.

In accordance with embodiments of the present disclosure, a system may include a chassis comprising a plurality of slots, each of the plurality of slots configured to receive a respective modular information handling system, a shared infrastructure comprising a plurality of components which are shared by modular information handling systems received in the slots, and a controller communicatively coupled to the slots and configured to determine a shared infrastructure power consumption indicative of power consumed by the shared infrastructure, allocate the shared infrastructure power consumption among modular information handling systems received in the slots, and set a respective host-level power limit for each of the modular information handling systems received in the slots, such that each modular information handling system consumes power in accordance with its respective host-level power limit.

In accordance with these and other embodiments of the present disclosure, a method may include determining a shared infrastructure power consumption indicative of power consumed by a shared infrastructure comprising a plurality of components which are shared by modular information handling systems received in respective slots of a chassis, allocating the shared infrastructure power consumption among modular information handling systems received in the slots, and setting a respective host-level power limit for each of the modular information handling systems received in the slots, such that each modular information handling system consumes power in accordance with its respective host-level power limit.

In accordance with these and other embodiments of the present disclosure, an article of manufacture may include a non-transitory computer readable medium and computer-executable instructions carried on the computer readable medium, the instructions readable by a processor, the instructions, when read and executed, for causing the processor to determine a shared infrastructure power consumption indicative of power consumed by a shared infrastructure comprising a plurality of components which are shared by modular information handling systems received in respective slots of a chassis, allocate the shared infrastructure power consumption among modular information handling systems received in the slots, and set a respective host-level power limit for each of the modular information handling systems received in the slots, such that each modular information handling system consumes power in accordance with its respective host-level power limit.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
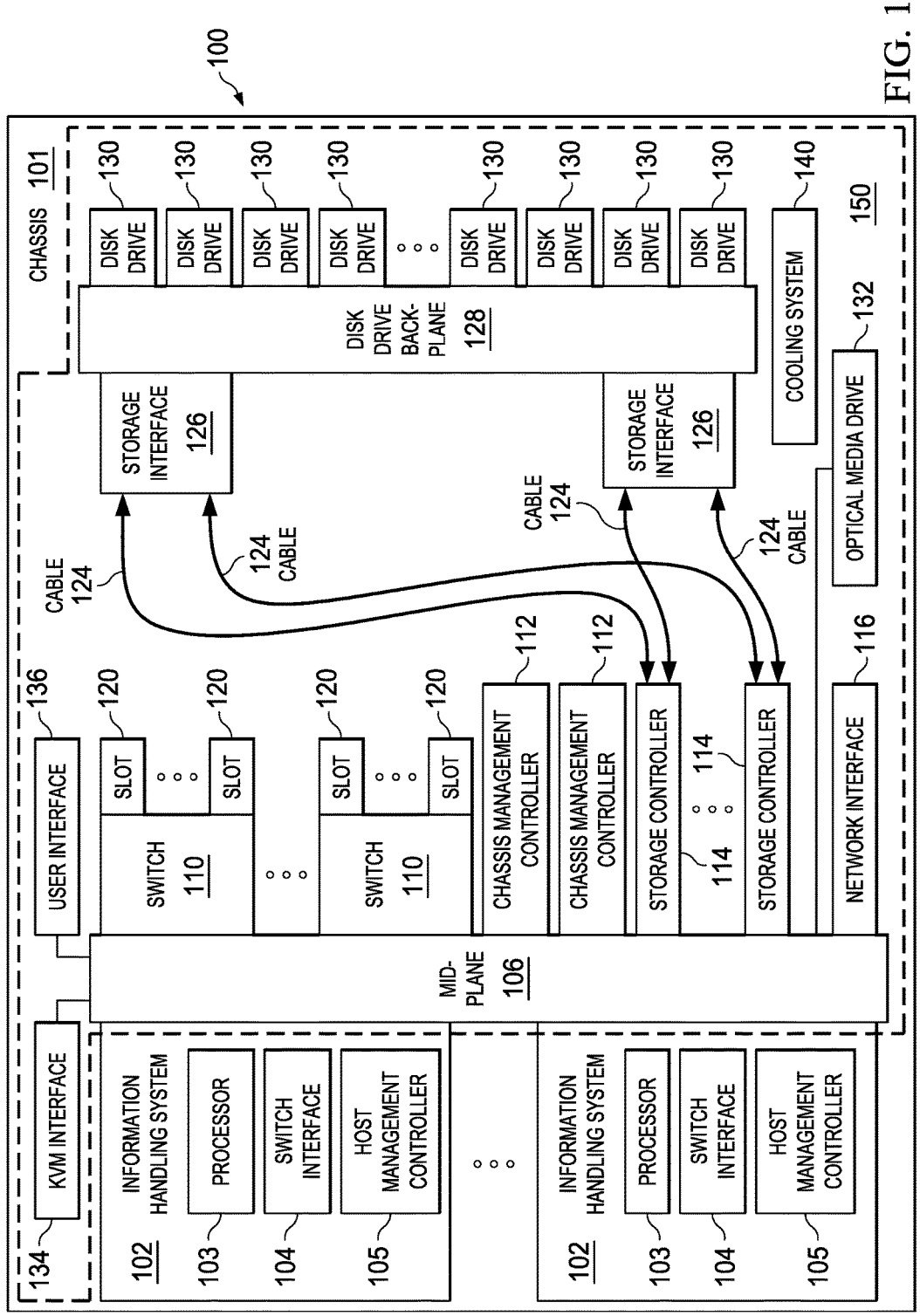
FIG. 1 illustrates a block diagram of an example system chassis with multiple information handling systems and with various shared infrastructure peripheral and I/O capabilities common to the chassis as a whole, in accordance with embodiments of the present disclosure.

Preferred embodiments and their advantages are best understood by reference to FIGS. 1 through 4B, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various I/O devices, such as a keyboard, a mouse, and a video display. The information handling system may also include one or more buses operable to transmit communication between the various hardware components.

For the purposes of this disclosure, information handling resources may broadly refer to any component system, device or apparatus of an information handling system, including without limitation processors, buses, memories, I/O devices and/or interfaces, storage resources, network interfaces, motherboards, electro-mechanical devices (e.g., fans), displays, and power supplies.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory ("RAM"), read-only memory ("ROM"), electrically erasable programmable read-only memory ("EEPROM"), and/or flash memory; as well as communications media such as wires, optical fibers, microwaves, radio waves, and other electromagnetic and/or optical carriers; and/or any combination of the foregoing.

Information handling systems often use an array of physical storage resources (e.g., disk drives), such as a Redundant Array of Independent Disks ("RAID"), for example, for storing information. Arrays of physical storage resources typically utilize multiple disks to perform input and output operations and can be structured to provide redundancy which may increase fault tolerance. Other advantages of arrays of physical storage resources may be increased data integrity, throughput and/or capacity. In operation, one or more physical storage resources disposed in an array of physical storage resources may appear to an operating system as a single logical storage unit or "logical unit." Implementations of physical storage resource arrays can range from a few physical storage resources disposed in a chassis, to hundreds of physical storage resources disposed in one or more separate storage enclosures.

FIG. 1 illustrates a block diagram of an example system 100 having a chassis 101 with multiple information handling systems 102 and with a shared infrastructure including various peripheral and I/O capabilities common to chassis 101 as a whole, in accordance with embodiments of the present disclosure. As depicted in FIG. 1, system 100 may comprise a chassis 101 including a plurality of information handling systems 102, a mid-plane 106, one or more switches 110, a chassis controller 112, a network interface 116, one or more slots 120, one or more cables 124, one or more storage interfaces 126, a disk drive backplane 128, a plurality of disk drives 130, an optical media drive 132, a keyboard-video-mouse ("KVM") interface 134, a user interface 136, and a cooling system 140.

An information handling system 102 may generally be operable to receive data from and/or communicate data to one or more disk drives 130 and/or other information handling resources of chassis 101 via mid-plane 106 and/or switches 110. In certain embodiments, an information handling system 102 may be a server. In such embodiments, an information handling system 102 may comprise a blade server having modular physical design. In these and other embodiments, an information handling system 102 may comprise an M class server. As depicted in FIG. 1, an information handling system 102 may include a processor 103, one or more switch interfaces 104 communicatively coupled to processor 103, and a host management controller 105 communicatively coupled to processor 103.

A processor 103 may include any system, device, or apparatus configured to interpret and/or execute program instructions and/or process data, and may include, without limitation, a microprocessor, microcontroller, digital signal processor ("DSP"), application specific integrated circuit ("ASIC"), or any other digital or analog circuitry configured to interpret and/or execute program instructions and/or process data. In some embodiments, processor 103 may interpret and/or execute program instructions and/or process data stored in a memory, a disk drive 130, and/or another component of system 100.

A switch interface 104 may comprise any system, device, or apparatus configured to provide an interface between its associated information handling system 102 and switches 110. In some embodiments, switches 110 may comprise Peripheral Component Interconnect Express ("PCIe") switches, in which case a switch interface 104 may comprise a switch card configured to create a PCIe-compliant interface between its associated information handling system 102 and switches 110. In other embodiments, a switch interface 104 may comprise an interposer. Use of switch interfaces 104 in information handling systems 102 may allow for minimal changes to be made to traditional servers (e.g., M class servers) while supporting the overall system architecture disclosed herein. Although FIG. 1 depicts an implementation including a single switch interface 104 per information handling system 102, in some embodiments each information handling system 102 may include a plurality of switch interfaces 104 for redundancy, high availability, and/or other reasons.

A host management controller 105 may be implemented by, for example, a microprocessor, microcontroller, DSP, ASIC, EEPROM, or any combination thereof. Host management controller 105 may be configured to communicate with one or more of chassis controllers 112 via midplane 106 (e.g., via an Ethernet management fabric). Host management controller 105 may be configured to provide out-of-band management facilities for management of information handling system 102. Such management may be made by elements of chassis 101 even if information handling system 102 is powered off or powered to a standby state. Host management controller 105 may include a processor, memory, and network connection separate from the rest of information handling system 102. In certain embodiments, host management controller 105 may include or may be an integral part of a baseboard management controller (BMC), Dell Remote Access Controller (DRAC) or an Integrated Dell Remote Access Controller (iDRAC).

Mid-plane 106 may comprise any system, device, or apparatus configured to interconnect modular information handling systems 102 with information handling resources. Accordingly, mid-plane 106 may include slots and/or connectors configured to receive information handling systems 102, switches 110, chassis controller 112, storage controllers 114, network interface 116, optical media drive 132, KVM interface 134, user interface 136, and/or other information handling resources. In one embodiment, mid-plane 106 may include a single board configured to interconnect modular information handling systems 102 with information handling resources. In another embodiment, mid-plane 106 may include multiple boards configured to interconnect modular information handling systems 102 with information handling resources. In yet another embodiment, mid-plane 106 may include cabling configured to interconnect modular information handling systems 102 with information handling resources.

A switch 110 may comprise any system, device, or apparatus configured to couple information handling systems 102 to storage controllers 114 (e.g., via mid-plane 106) and slots 120 and perform switching between information handling systems 102 and various information handling resources of system 100, including storage controllers 114 and slots 120. In certain embodiments, a switch 110 may comprise a PCIe switch. In other embodiments, a switch may comprise a generalized PC bus switch, an Infiniband switch, or other suitable switch. As shown in FIG. 1, chassis 101 may include a plurality of switches 110. In such embodiments, switches 110 may operate in a redundant mode for shared devices (e.g., storage controllers 114 and/or devices coupled to slots 120) and in non-redundant mode for non-shared/zoned devices. As used herein, shared devices may refer to those which may be visible to more than one information handling system 102, while non-shared devices may refer to those which are visible to only a single information handling system 102. In some embodiments, mid-plane 106 may include a single switch 110.

Chassis controller 112 may be any system, device, or apparatus configured to facilitate management and/or control of system 100, its information handling systems 102, and/or one or more of its component information handling resources. Chassis controller 112 may be configured to issue commands and/or other signals to manage and/or control information handling system 102 and/or information handling resources of system 100. Chassis controller 112 may comprise a microprocessor, microcontroller, DSP, ASIC, field programmable gate array ("FPGA"), EEPROM, or any combination thereof. As shown in FIG. 1, chassis controller 112 may be coupled to mid-plane 106. In some embodiments, a chassis controller 112 may provide a user interface and high level controls for management of switches 110, including configuring assignments of individual information handling systems 102 to non-shared information handling resources of system 100. In these and other embodiments, a chassis controller 112 may define configurations of the storage subsystem (e.g., storage controllers 114, storage interfaces 126, disk drives 130, etc.) of system 100. For example, a chassis controller 112 may provide physical function configuration and status information that would normally occur at the driver level in traditional server implementations. Examples of physical functions include disk drive discovery and status, RAID configuration, and logical volume mapping.

In addition or alternatively, a chassis controller 112 may also provide a management console for user/administrator access to these functions. For example, a chassis management controller 112 may implement Web Services Management ("WS-MAN") or another suitable management protocol permitting a user to remotely access a chassis controller 112 to configure system 100 and its various information handling resources. In such embodiments, a chassis controller 112 may interface with a network interface separate from network interface 116, thus allowing for "out-of-band" control of system 100, such that communications to and from chassis management controller 112 are communicated via a management channel physically isolated from an "in band" communication channel with network interface 116. Thus, for example, if a failure occurs in system 100 that prevents an administrator from interfacing with system 100 via network interface 116 and/or user interface 136 (e.g., operating system failure, power failure, etc.), the administrator may still be able to monitor and/or manage system 100 (e.g., to diagnose problems that may have caused failure) via a chassis controller 112. In the same or alternative embodiments, chassis controller 112 may allow an administrator to remotely manage one or more parameters associated with operation of system 100 and its various information handling resources (e.g., power usage, processor allocation, memory allocation, security privileges, etc.). A chassis controller 112 may also be known as a chassis management controller or a satellite controller.

A storage controller 114 may include any system, apparatus, or device operable to manage the communication of data between one or more of information handling systems 102 and one or more of disk drives 130. In certain embodiments, a storage controller 114 may provide functionality including, without limitation, disk aggregation and redundancy (e.g., RAID), I/O routing, and error detection and recovery. As shown in FIG. 1, a storage controller 114 may be coupled to a connector on a switch 110. Also as shown in FIG. 1, system 100 may include a plurality of storage controllers 114, and in such embodiments, storage controllers 114 may be configured as redundant. In addition or in the alternative, storage controllers 114 may in some embodiments be shared among two or more information handling systems 102. As also shown in FIG. 1, each storage controller 114 may be coupled to one or more storage interfaces 126 via cables 124. For example, in some embodiments, each storage controller 114 may be coupled to a single associated storage interface 126 via a cable 124. In other embodiments, each storage controller 114 may be coupled to two or more storage interfaces 126 via a plurality of cables 124, thus permitting redundancy as shown in FIG. 1. Storage controllers 114 may also have features supporting shared storage and high availability. For example, in PCIe implementations, a unique PCIe identifier may be used to indicate shared storage capability and compatibility in system 100.

As depicted in FIG. 1, switch 110 may have coupled thereto one or more slots 120. A slot 120 may include any system, device, or apparatus configured to allow addition of one or more expansion cards to chassis 101 in order to electrically couple such expansion cards to a switch 110. Such slots 120 may comprise any suitable combination of full-height risers, full-height slots, and low-profile slots. A full-height riser may include any system, device, or apparatus configured to allow addition of one or more expansion cards (e.g., a full-height slot) having a physical profile or form factor with dimensions that practically prevent such expansion cards to be coupled in a particular manner (e.g., perpendicularly) to mid-plane 106 and/or switch 110 (e.g., the proximity of information handling resources in chassis 101 prevents physical placement of an expansion card in such a manner). Accordingly, a full-height riser may itself physically couple with a low profile to mid-plane 106, a switch 110, or another component, and full-height cards may then be coupled to full-height slots of a full-height riser. On the other hand, low-profile slots may be configured to couple low-profile expansion cards to switches 110 without the need for a full-height riser.

Slots 120 may also include electrically conductive elements (e.g., edge connectors, traces, etc.) allowing for expansion cards inserted into slots 120 to be electrically coupled to switches 110. In operation, switches 110 may manage switching of communications between individual information handling systems 102 and expansion cards coupled to slots 120. In some embodiments, slots 120 may be nonshared (e.g., each slot 120 is associated with a single information handling system 102). In other embodiments, one or more of slots 120 may be shared among two or more information handling systems 102. In these and other embodiments, one or more slots 120 may be configured to be compatible with PCIe, generalized PC bus switch, Infiniband, or another suitable communication specification, standard, or protocol.

Network interface 116 may include any suitable system, apparatus, or device operable to serve as an interface between chassis 101 and an external network (e.g., a local area network or other network). Network interface 116 may enable information handling systems 102 to communicate with the external network using any suitable transmission protocol (e.g., TCP/IP) and/or standard (e.g., IEEE 802.11, Wi-Fi). In certain embodiments, network interface 116 may include a network interface card ("NIC"). In the same or alternative embodiments, network interface 116 may be configured to communicate via wireless transmissions. In the same or alternative embodiments, network interface 116 may provide physical access to a networking medium and/or provide a low-level addressing system (e.g., through the use of Media Access Control addresses). In some embodiments, network interface 116 may be implemented as a local area network ("LAN") on motherboard ("LOM") interface.

In some embodiments, various components of chassis 101 may be coupled to a planar. For example, a planar may interconnect switches 110, chassis management controller 112, storage controllers 114, network interface 116, optical media drive 132, KVM interface 134, user interface 136, and/or other modular information handling resources of chassis 101 to mid-plane 106 of system 100. Accordingly, such planar may include slots and/or connectors configured to interconnect with such information handling resources.

Storage interfaces 126 may include any system, device, or apparatus configured to facilitate communication between storage controllers 114 and disk drives 130. For example, a storage interface 126 may serve to permit a relatively small number of communication links (e.g., two) between storage controllers 114 and storage interfaces 126 to communicate with a greater number (e.g., 25) of disk drives 130. Thus, a storage interface 126 may provide a switching mechanism and/or disk drive addressing mechanism that allows an information handling system 102 to communicate with numerous disk drives 130 via a limited number of communication links and/or channels. Accordingly, a storage interface 126 may operate like an Ethernet hub or network switch that allows multiple systems to be coupled using a single switch port (or relatively few switch ports). A storage interface 126 may be implemented as an expander (e.g., a Serial Attached SCSI ("SAS") expander), an Ethernet switch, a FibreChannel switch, Internet Small Computer System Interface (iSCSI) switch, or any other suitable switch. In order to support high availability storage, system 100 may implement a plurality of redundant storage interfaces 126, as shown in FIG. 1.

Disk drive backplane 128 may comprise any system, device, or apparatus configured to interconnect modular storage interfaces 126 with modular disk drives 130. Accordingly, disk drive backplane 128 may include slots and/or connectors configured to receive storage interfaces 126 and/or disk drives 130. In some embodiments, system 100 may include two or more backplanes, in order to support differently-sized disk drive form factors. To support redundancy and high availability, a disk drive backplane 128 may be configured to receive a plurality (e.g., 2) of storage interfaces 126 which couple two storage controllers 114 to each disk drive 130.

Each disk drive 130 may include computer-readable media (e.g., magnetic storage media, optical storage media, opto-magnetic storage media, and/or other type of rotating storage media, flash memory, and/or other type of solid state storage media) and may be generally operable to store data and/or programs (e.g., one or more operating systems and/or one or more application programs). Although disk drives 130 are depicted as being internal to chassis 101 in FIG. 1, in some embodiments, one or more disk drives 130 may be located external to chassis 101 (e.g., in one or more enclosures external to chassis 101).

Optical media drive 132 may be coupled to mid-plane 106 and may include any suitable system, apparatus, or device configured to read data from and/or write data to an optical storage medium (e.g., a compact disc, digital versatile disc, blue laser medium, and/or other optical medium). In certain embodiments, optical media drive 132 may use laser light or other electromagnetic energy to read and/or write data to an optical storage medium. In some embodiments, optical media drive 132 may be nonshared and may be user-configurable such that optical media drive 132 is associated with a single information handling system 102.

KVM interface 134 may be coupled to mid-plane 106 and may include any suitable system, apparatus, or device configured to couple to one or more of a keyboard, video display, and mouse and act as a switch between multiple information handling systems 102 and the keyboard, video display, and/or mouse, thus allowing a user to interface with a plurality of information handling systems 102 via a single keyboard, video display, and/or mouse.

User interface 136 may include any system, apparatus, or device via which a user may interact with system 100 and its various information handling resources by facilitating input from a user allowing the user to manipulate system 100 and output to a user allowing system 100 to indicate effects of the user's manipulation. For example, user interface 136 may include a display suitable for creating graphic images and/or alphanumeric characters recognizable to a user, and may include, for example, a liquid crystal display, cathode ray tube, a plasma screen, and/or a digital light processor projection monitor. In certain embodiments, such a display may be an integral part of chassis 101 and receive power from power supplies (not explicitly shown) of chassis 101, rather than being coupled to chassis 101 via a cable. In some embodiments, such display may comprise a touch screen device capable of receiving user input, wherein a touch sensor may be mechanically coupled or overlaid upon the display and may comprise any system, apparatus, or device suitable for detecting the presence and/or location of a tactile touch, including, for example, a resistive sensor, capacitive sensor, surface acoustic wave sensor, projected capacitance sensor, infrared sensor, strain gauge sensor, optical imaging sensor, dispersive signal technology sensor, and/or acoustic pulse recognition sensor. In these and other embodiments, user interface 136 may include other user interface elements (e.g., a keypad, buttons, and/or switches placed in proximity to a display) allowing a user to provide input to system 100. User interface 136 may be coupled to chassis management controllers 112 and/or other components of system 100, and thus may allow a user to configure various information handling resources of system 100 (e.g., assign individual information handling systems 102 to particular information handling resources).

Cooling system 140 may comprise any system, device, or apparatus for cooling components of chassis 101. For example, cooling system 140 may comprise air movers (e.g., fans or blowers) for causing a cooling air flow over components of chassis 101, a liquid coolant conveyance network for distributing a cooling liquid to components of chassis 101, and/or any other system suitable for cooling components of chassis 101. In some embodiments, such cooling system may also include sensors (e.g., temperature sensors) and/or control logic for controlling operational parameters (e.g., rotational speeds of motors of air movers) of cooling system 140.

As described in greater detail below, chassis controller 112 may determine an amount of power consumed by shared infrastructure 150, and allocate such shared infrastructure power for purposes of power management to individual modular information handling systems 102, such allocation being an equal allocation to modular information handling systems 102 or a weighted allocation in accordance with a predetermined weighting factor or dependent upon each modular information handling system's usage of particular components or subsystems of shared infrastructure 150.

Figure 2:
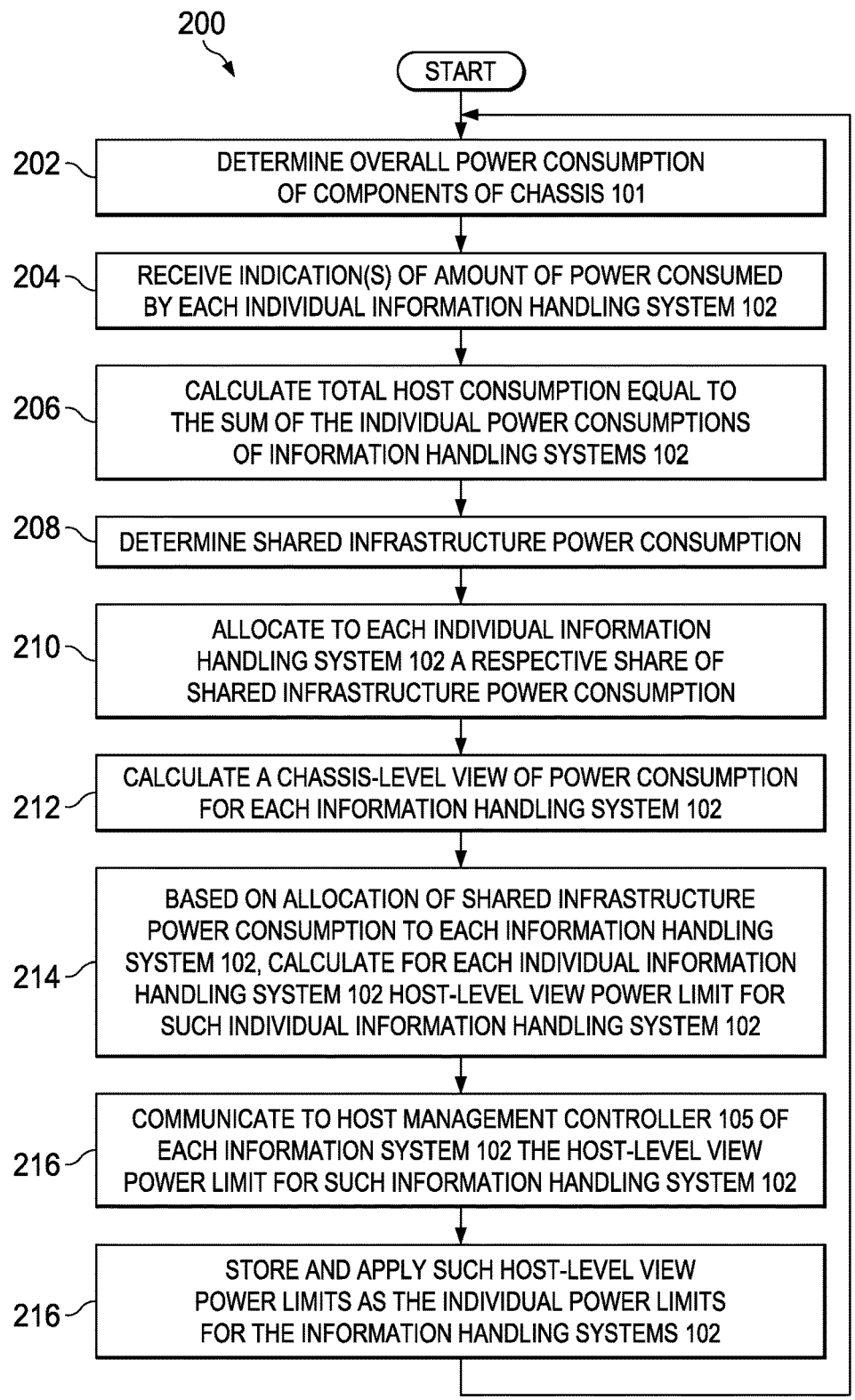
FIG. 2 illustrates a flow chart of an example method for power management in the system of FIG. 1, in accordance with embodiments of the present disclosure.

FIG. 2 illustrates a flow chart of an example method 200 for power management in system 100, in accordance with embodiments of the present disclosure. According to certain embodiments, method 200 may begin at step 202. As noted above, teachings of the present disclosure may be implemented in a variety of configurations of system 100 as shown in FIG. 1. As such, the preferred initialization point for method 200 and the order of the steps comprising method 200 may depend on the implementation chosen. In these and other embodiments, method 200 may be implemented as firmware, software, applications, functions, libraries, or other instructions.

At step 202, chassis controller 112 may determine an overall power consumption of all or nearly all components of chassis 101, including information handling systems 102 and shared infrastructure 150. Such overall power consumption may be determined in any suitable manner, including without limitation measuring a power, current, and/or voltage delivered by power supplies supplying electrical energy to components of chassis 101. At step 204, chassis controller 112 may receive from host management controllers 105 of individual information handling systems 102 messages indicating an amount of power consumed by each individual information handling system 102. Each host management controller 105 may determine the power consumption of its corresponding information handling system 102 in any suitable manner, including without limitation, reading such level of consumed power from an Intel Node Manager or similar component of information handling system 102. At step 206, chassis controller 112 may calculate a total host consumption equal to the sum of the individual power consumptions of information handling systems 102. At step 208, chassis controller 112 may determine the shared infrastructure power consumption by subtracting the total host consumption from the overall power consumption of chassis 101.

Figure 4A:
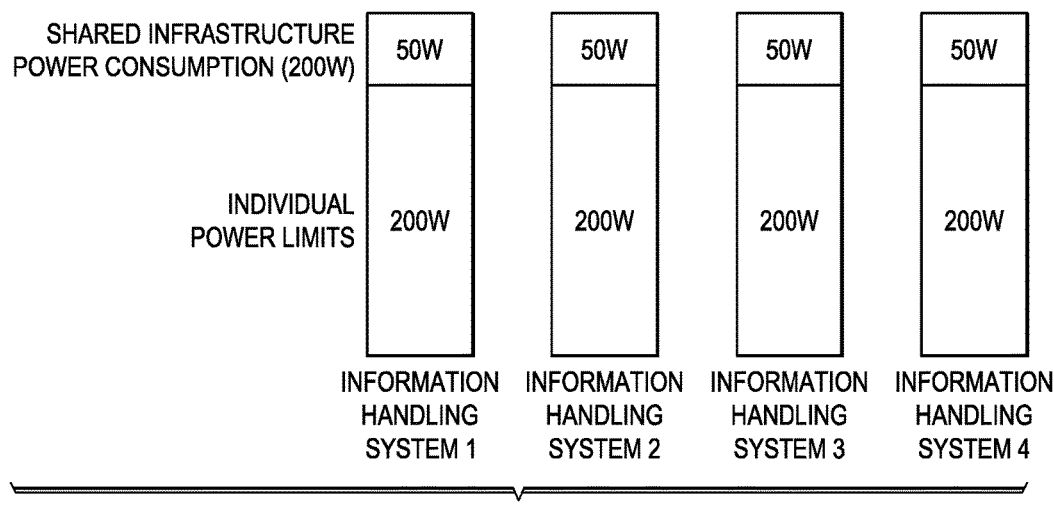
FIGS. 4A and 4B illustrate a chart showing allocation of shared infrastructure power consumption among multiple information handling systems in a chassis, in accordance with embodiments of the present disclosure.
Figure 4B:
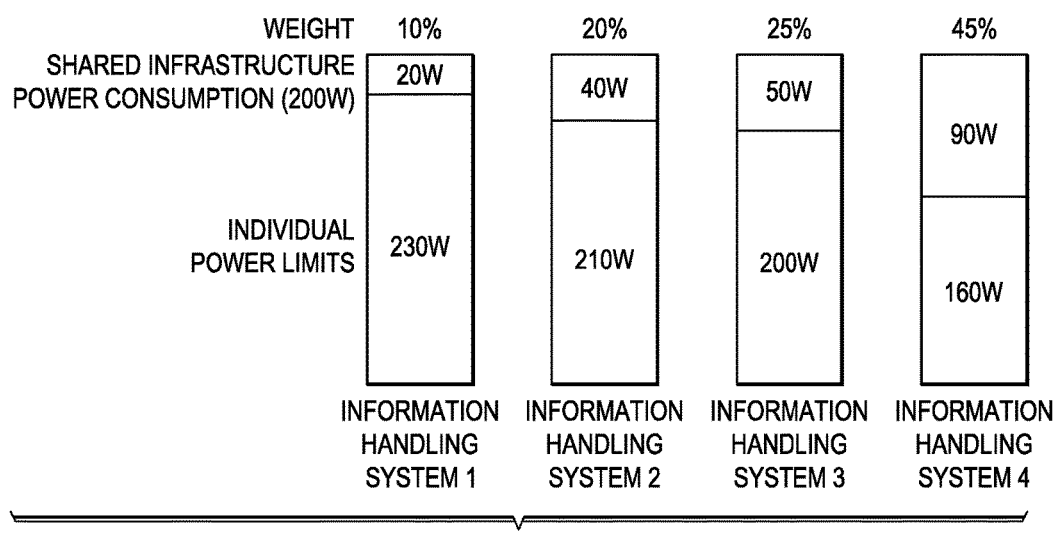

At step 210, chassis controller 112 may allocate to each individual information handling system 102 a respective share of the shared infrastructure power consumption, such that all of the shared infrastructure power consumption is allocated to individual information handling system 102. In some embodiments, such allocation may be an equal allocation to each individual information handling system 102 (e.g., such that in a chassis 101 with four information handling systems 102, each information handling system 102 is allocated a 25% share of the shared infrastructure power consumption). An example of equal allocation of shared infrastructure power consumption is shown in FIG. 4A. In other embodiments, such allocation may be in accordance with a predetermined weight associated with each individual information handling system 102 (e.g., a user/administrator of system 100 may assign differing weights to each of information handling systems 102, and shared infrastructure power consumption is allocated in accordance with such weights). An example of equal allocation of shared infrastructure power consumption is shown in FIG. 4B.

At step 212, based on the allocation of shared infrastructure power consumption to each information handling system 102, chassis controller 112 (or in some embodiments, each individual host management controller 105), may calculate a chassis-level view of power consumption for such information handling system 102 equal to the sum of such information handling system's individual power consumption and such information handling system's share of the shared infrastructure power consumption.

At step 214, based on the allocation of shared infrastructure power consumption to each information handling system 102, chassis controller 112 (or in some embodiments, each individual host management controller 105) may calculate for each individual information handling system 102 a host-level view power limit for such individual information handling system 102. For example, in some embodiments, a user/administrator of system 100 may (e.g., via a management console interfaced with chassis controller 112 and/or host management controllers 105) set chassis-level view power consumption limits for each information handling system 102. In such embodiments, the host-level view power limit for an information handling system 102 may be equal to the chassis-level view power consumption limit minus the share of the information handling system shared infrastructure power consumption allocated to such information handling system 102. Accordingly, such host-level view power limit may dynamically change as the shared infrastructure power consumption varies.

At step 216, chassis controller 112 may communicate to host management controller 105 of each information handling system 102 the host-level view power limit for such information handling system 102. At step 218, each host management controller 105 may store and apply such host-level view power limit as the individual power limit for the information handling system 102 associated with the host management controller 105. For example, in some embodiments, such individual power limit may be communicated from a host management controller 105 to an Intel Node Manager or other similar component of an information handling system 102. After completion of step 218, method 200 may proceed again to step 202.

Although FIG. 2 discloses a particular number of steps to be taken with respect to method 200, method 200 may be executed with greater or fewer steps than those depicted in FIG. 2. In addition, although FIG. 2 discloses a certain order of steps to be taken with respect to method 200, the steps comprising method 200 may be completed in any suitable order.

Method 200 may be implemented using system 100, components thereof, or any other system such as those shown in FIG. 1 operable to implement method 200. In certain embodiments, method 200 may be implemented partially or fully in software and/or firmware embodied in computer-readable media.

Figure 3:
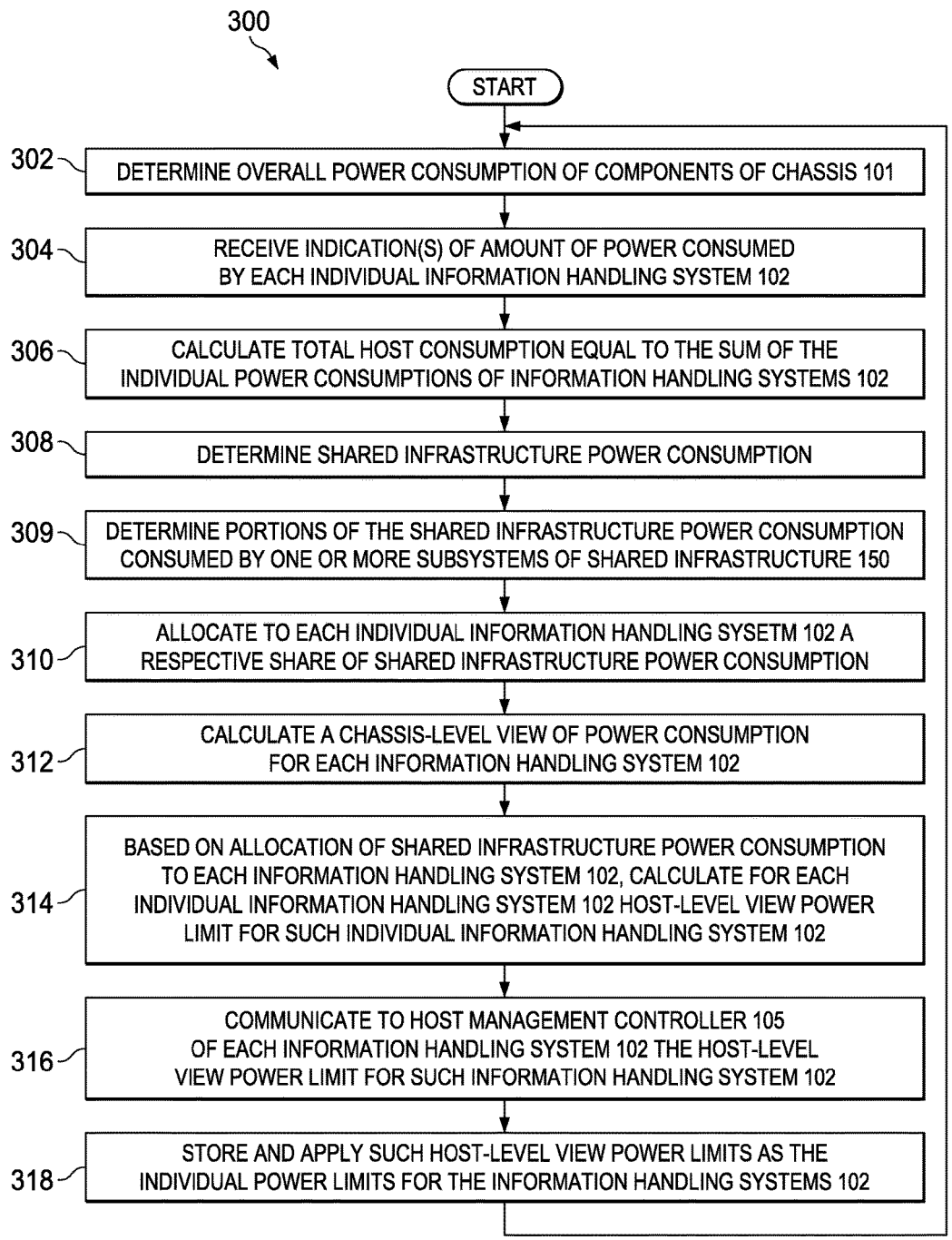
FIG. 3 illustrates a flow chart of another example method for power management in the system of FIG. 1, in accordance with embodiments of the present disclosure.

FIG. 3 illustrates a flow chart of another example method 300 for power management in system 100, in accordance with embodiments of the present disclosure. According to certain embodiments, method 300 may begin at step 302. As noted above, teachings of the present disclosure may be implemented in a variety of configurations of system 100 as shown in FIG. 1. As such, the preferred initialization point for method 300 and the order of the steps comprising method 300 may depend on the implementation chosen. In these and other embodiments, method 300 may be implemented as firmware, software, applications, functions, libraries, or other instructions.

At step 302, chassis controller 112 may determine an overall power consumption of all or nearly all components of chassis 101, including information handling systems 102 and shared infrastructure 150. Such overall power consumption may be determined in any suitable manner, including without limitation measuring a power, current, and/or voltage delivered by power supplies supplying electrical energy to components of chassis 101. At step 304, chassis controller 112 may receive from host management controllers 105 of individual information handling systems 102 messages indicating an amount of power consumed by each individual information handling system 102. Each host management controller 105 may determine the power consumption of its corresponding information handling system 102 in any suitable manner, including without limitation, reading such level of consumed power from an Intel Node Manager or similar component of information handling system 102. At step 306, chassis controller 112 may calculate a total host consumption equal to the sum of the individual power consumptions of information handling systems 102. At step 308, chassis controller 112 may determine the shared infrastructure power consumption by subtracting the total host consumption from the overall power consumption of chassis 101.

At step 309, chassis controller 112 (or in some embodiments, individual host management controllers 105) may determine portions of the shared infrastructure power consumption consumed by one or more subsystems of shared infrastructure 150. For example, in some embodiments, chassis controller 112 may determine which portion of the shared infrastructure power consumption is consumed by cooling system 140, which portion of the shared infrastructure power consumption is consumed by a storage subsystem (e.g., storage controllers 114, storage interfaces 126, disk drive backplane 128, disk drives 130), and the portion of the shared infrastructure power consumption which is consumed by the remainder of shared infrastructure 150. Such subsystem power consumption levels may be determined in any suitable manner. For example, fan speed tables or fan speed curve information stored in host management controller 105 (e.g., which may correlate fan speeds to power limits) may be used to determine which portion of the shared infrastructure power consumption is consumed by cooling system 140. For instance, using a fan curve, a host management controller 105 may determine which portion of the shared infrastructure power consumption is consumed by cooling system 140 based on a maximum fan speed requested by information handling systems 102.

At step 310, chassis controller 112 may allocate to each individual information handling system 102 a respective share of the shared infrastructure power consumption, such that all of the shared infrastructure power consumption is allocated to an individual information handling system 102. In some embodiments, such allocation may be an equal allocation to each individual information handling system 102 (e.g., such that in a chassis 101 with four information handling systems 102, each information handling system 102 is allocated a 25% share of the shared infrastructure power consumption). In other embodiments, such allocation may be in accordance with a predetermined weight associated with each individual information handling system 102 (e.g., a user/administrator of system 100 may assign differing weights to each of information handling systems 102, and shared infrastructure power consumption is allocated in accordance with such weights). In yet other embodiments, such allocation may be made by chassis controller 112 based on utilization by shared infrastructure 150 by individual information handling systems 102. For instance, information handling systems 102 with higher fan speed requests for cooling system 140 may be allocated a smaller share of shared infrastructure power consumption than those information handling systems 102 with lower fan speed requests, thus allowing information handling systems 102 with larger workloads to have a lower share of allocated shared infrastructure power consumption, and thus higher host-level view power consumption limits.

At step 312, based on the allocation of shared infrastructure power consumption to each information handling system 102, chassis controller 112 (or in some embodiments, each individual host management controller 105), may calculate a chassis-level view of power consumption for such information handling system 102 equal to the sum of such information handling system's individual power consumption and such information handling system's share of the shared infrastructure power consumption.

At step 314, based on the allocation of shared infrastructure power consumption to each information handling system 102, chassis controller 112 (or in some embodiments, each individual host management controller 105), may calculate for each individual information handling system 102 a host-level view power limit for such individual information handling system 102. For example, in some embodiments, a user/administrator of system 100 may (e.g., via a management console interfaced with chassis controller 112 and/or host management controllers 105) set chassis-level view power consumption limits for each information handling system 102. In such embodiments, the host-level view power limit for an information handling system 102 may be equal to the chassis-level view power consumption limit minus the share of the information handling system shared infrastructure power consumption allocated to such information handling system 102. Accordingly, such host-level view power limit may dynamically change as the shared infrastructure power consumption varies.

At step 316, chassis controller 112 may communicate to host management controller 105 of each information handling system 102 the host-level view power limit for such information handling system 102. At step 318, each host management controller 105 may store and apply such host-level view power limit as the individual power limit for the information handling system 102 associated with the host management controller 105. For example, in some embodiments, such individual power limit may be communicated from a host management controller 105 to an Intel Node Manager or other similar component of an information handling system 102. After completion of step 318, method 300 may proceed again to step 302.

Although FIG. 3 discloses a particular number of steps to be taken with respect to method 300, method 300 may be executed with greater or fewer steps than those depicted in FIG. 3. In addition, although FIG. 3 discloses a certain order of steps to be taken with respect to method 300, the steps comprising method 300 may be completed in any suitable order.

Method 300 may be implemented using system 100, components thereof, or any other system such as those shown in FIG. 1 operable to implement method 300. In certain embodiments, method 300 may be implemented partially or fully in software and/or firmware embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A system comprising:
a chassis comprising a plurality of slots, each of the plurality of slots configured to receive a respective modular information handling system;
a shared infrastructure comprising a plurality of components which are shared by modular information handling systems received in the slots; and
a controller communicatively coupled to the slots and configured to:
determine a shared infrastructure electrical power consumption amount that is indicative of electrical power consumed by the shared infrastructure;
apportion the shared infrastructure electrical power consumption amount among two or more modular information handling systems received in the slots such that the modular information handling systems are each responsible for a respective portion of the shared infrastructure electrical power consumption amount that is allocated to that modular information handling system; and
set a respective host-level electrical power limit for each of the modular information handling systems received in the slots, such that each modular information handling system is configured to consume electrical power in accordance with its respective host-level electrical power limit, wherein each respective host-level electrical power limit indicates a limit on a sum total of the electrical power to be consumed by the respective modular information handling system and the portion of the shared infrastructure electrical power consumption amount apportioned to that modular information handling system, wherein the portion of the shared infrastructure electrical power consumption includes a portion of power consumed by a shared cooling component or a shared data storage component.

2. The system of claim 1, wherein the controller is configured to determine the shared infrastructure electrical power consumption amount based on a total electrical power consumption of components of the chassis and a total electrical power consumption of modular information handling systems received in the slots.

3. The system of claim 1, wherein the controller is configured to apportion the shared infrastructure electrical power consumption amount equally among the modular information handling systems received in the slots.

4. The system of claim 1, wherein the controller is configured to apportion the shared infrastructure electrical power consumption amount among the modular information handling systems received in the slots based on a weighting factor associated with each of the modular information handling systems.

5. The system of claim 1, wherein the controller is configured to apportion the shared infrastructure electrical power consumption amount among the modular information handling systems received in the slots based on a utilization of one or more subsystems of the shared infrastructure by each modular information handling system.

6. The system of claim 1, wherein the controller is further configured to modify the respective host-level electrical power limits based on changes to the shared infrastructure electrical power consumption amount.

7. A method comprising:
   determining a shared infrastructure electrical power consumption amount that is indicative of electrical power consumed by a shared infrastructure comprising a plurality of components which are shared by modular information handling systems received in respective slots of a chassis;
   apportioning the shared infrastructure electrical power consumption amount among two or more modular information handling systems received in the slots such that the modular information handling systems are each responsible for a respective portion of the shared infrastructure electrical power consumption amount that is allocated to that modular information handling system; and
   setting a respective host-level electrical power limit for each of the modular information handling systems received in the slots, such that each modular information handling system consumes electrical power in accordance with its respective host-level electrical power limit, wherein each respective host-level electrical power limit indicates a limit on a sum total of the electrical power to be consumed by the respective modular information handling system and the portion of the shared infrastructure electrical power consumption amount apportioned to that modular information handling system, wherein the portion of the shared infrastructure electrical power consumption includes a portion of power consumed by a shared cooling component or a shared data storage component.

8. The method of claim 7, further comprising determining the shared infrastructure electrical power consumption amount based on a total electrical power consumption of components of the chassis and a total electrical power consumption of modular information handling systems received in the slots.

9. The method of claim 7, further comprising apportioning the shared infrastructure electrical power consumption amount equally among the modular information handling systems received in the slots.

10. The method of claim 7, further comprising apportioning the shared infrastructure electrical power consumption amount among the modular information handling systems received in the slots based on a weighting factor associated with each of the modular information handling systems.

11. The method of claim 7, further comprising apportioning the shared infrastructure electrical power consumption amount among the modular information handling systems received in the slots based on a utilization of one or more subsystems of the shared infrastructure by each modular information handling system.

12. The method of claim 7, further comprising modifying the respective host-level electrical power limits based on changes to the shared infrastructure electrical power consumption amount.

13. An article of manufacture comprising:
    a non-transitory computer readable medium; and
    computer-executable instructions carried on the computer readable medium, the instructions readable by a processor, the instructions, when read and executed, for causing the processor to:
    determine a shared infrastructure electrical power consumption amount that is indicative of electrical power consumed by a shared infrastructure comprising a plurality of components which are shared by modular information handling systems received in respective slots of a chassis;
    apportion the shared infrastructure electrical power consumption amount among two or more modular information handling systems received in the slots such that the modular information handling systems are each responsible for a respective portion of the shared infrastructure electrical power consumption amount that is allocated to that modular information handling system; and
    set a respective host-level electrical power limit for each of the modular information handling systems received in the slots, such that each modular information handling system consumes electrical power in accordance with its respective host-level electrical power limit, wherein each respective host-level electrical power limit indicates a limit on a sum total of the electrical power to be consumed by the respective modular information handling system and the portion of the shared infrastructure electrical power consumption amount apportioned to that modular information handling system, wherein the portion of the shared infrastructure electrical power consumption includes a portion of power consumed by a shared cooling component or a shared data storage component.

14. The article of claim 13, the instructions for further causing the processor to determine the shared infrastructure electrical power consumption amount based on a total electrical power consumption of components of the chassis and a total electrical power consumption of modular information handling systems received in the slots.

15. The article of claim 13, the instructions for further causing the processor to apportion the shared infrastructure electrical power consumption amount equally among the modular information handling systems received in the slots.

16. The article of claim 13, the instructions for further causing the processor to apportion the shared infrastructure electrical power consumption amount among the modular information handling systems received in the slots based on a weighting factor associated with each of the modular information handling systems.

17. The article of claim 13, the instructions for further causing the processor to apportion the shared infrastructure electrical power consumption amount among the modular information handling systems received in the slots based on a utilization of one or more subsystems of the shared infrastructure by each modular information handling system.

18. The article of claim 13, the instructions for further causing the processor to modify the respective host-level electrical power limits based on changes to the shared infrastructure electrical power consumption amount.

* * * * *